United States Patent [19]

Hakoun et al.

[11] Patent Number: 4,988,861
[45] Date of Patent: Jan. 29, 1991

[54] DEVICE FOR MEASURING THE ENERGY OF AN ELECTRIC ARC

[75] Inventors: Roland Hakoun, Domont; Pascal Repain, Chatou, both of France

[73] Assignee: Societe Anonyme dite: Compagnie Lyonnaise De Transmissions Optiques, Chichy, France

[21] Appl. No.: 353,595

[22] Filed: May 18, 1989

[30] Foreign Application Priority Data

May 24, 1988 [FR] France ................................ 88 06877

[51] Int. Cl.$^5$ .............................................. H01J 5/16
[52] U.S. Cl. ................................ 250/227.11; 350/96.1
[58] Field of Search ........................... 250/227, 227.11; 350/96.1

[56] References Cited

U.S. PATENT DOCUMENTS 3,942,892  3/1976  Ambrose et al. .
4,594,546  6/1986  Greene ................................ 250/227
4,641,968  2/1987  Grandy .
4,843,234  6/1989  Berthold ............................. 350/96.1

FOREIGN PATENT DOCUMENTS 7237458  9/1972  Fed. Rep. of Germany .
1515290  6/1978  United Kingdom .

Primary Examiner—David C. Nelms
Assistant Examiner—Sherrie Hsia
Attorney, Agent, or Firm—Sughrue, Mion, Zinn, Macpeak & Seas

[57] ABSTRACT

The device for measuring the energy of an electric arc consists of a support (1) for at least one optical fiber disposed on the head of an electrode (2) of the arc, the support being made of a plastic material of suitable dielectric strength, one or several optical fibers (10) constrained on the support and one end or ends whereof arrive near the tip of the electrode, an optical connector (15, 16) receiving on the one hand the other end of said fibers(s) and on the other hand the end of an optical fiber cable (17) for connecting with a photoelectric cell (18), a photoelectric cell (18) disposed at some distance from the electrode and electronic means (20) connected to the cell (18) and used to record and display the energy given off by the arc.

7 Claims, 3 Drawing Sheets

DEVICE FOR MEASURING THE ENERGY OF AN ELECTRIC ARC

This invention concerns a device for measuring the energy of an electric arc, given off in the form of light, ultraviolet or infrared radiation.

In the present state of the art, how to measure the instantaneous energy given off in an electric arc by electrical measurements is poorly understood, for it is difficult to separate the energy consumed by the arc from that consumed by the heating of the electrodes.

The present invention is directed to providing an accurate end instantaneous measurement of the energy in an electric arc, with the help of a very simple apparatus that can be replaced at low cost if it becomes damaged by the heat of the arc.

The inventive measuring device consists of the following parts:

(a) a support for at least one optical fiber disposed on the head of an electrode of the arc, made of a plastic material having sufficient dielectric strength that it will not disturb the operation of the arc, (b) at least one optical fiber secured on this support and having an end arriving adjacent to the tip of the electrode.

(c) an optical connector receiving on the one hand the other end of the optical fiber and on the other hand one end of an optical fiber cable for connecting with a photoelectric cell, (d) a photoelectric cell disposed at a sufficient distance from the electrode to be immune to disturbances due thereto, and (e) an electronic means connected to the photoelectric cell and recording and displaying the energy given off by the arc.

The preferred embodiment of the invention further comprises the following features:

The optical fiber support is fitted to the electrode by snapping on the end of a nut screwed onto the threaded periphery of the electrode.

The optical fiber support is provided with at least one cross-groove accommodating the optical fiber.

A plurality of optical fibers are regularly distributed around the periphery of the fiber support.

The fiber support is made of polyphenylsulfone.

The nut for fixing the support is likewise made of polyphenylsulfone.

The electronic recording means is connected to a printer.

A device according to the invention for measuring the energy of an electric arc will now be described by way of example, with reference to the appended drawings, in which.

Figure 1:
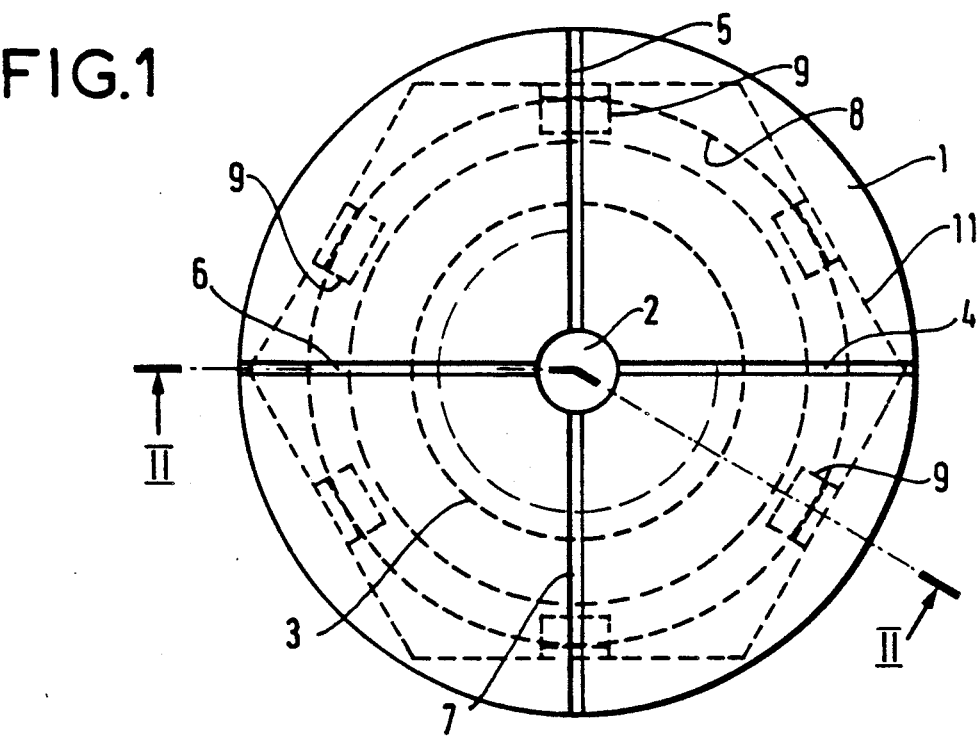
FIG. 1 is a front elevation of a support for an optical fiber or for optical fibers around an electrode forming an anode.
Figure 2:
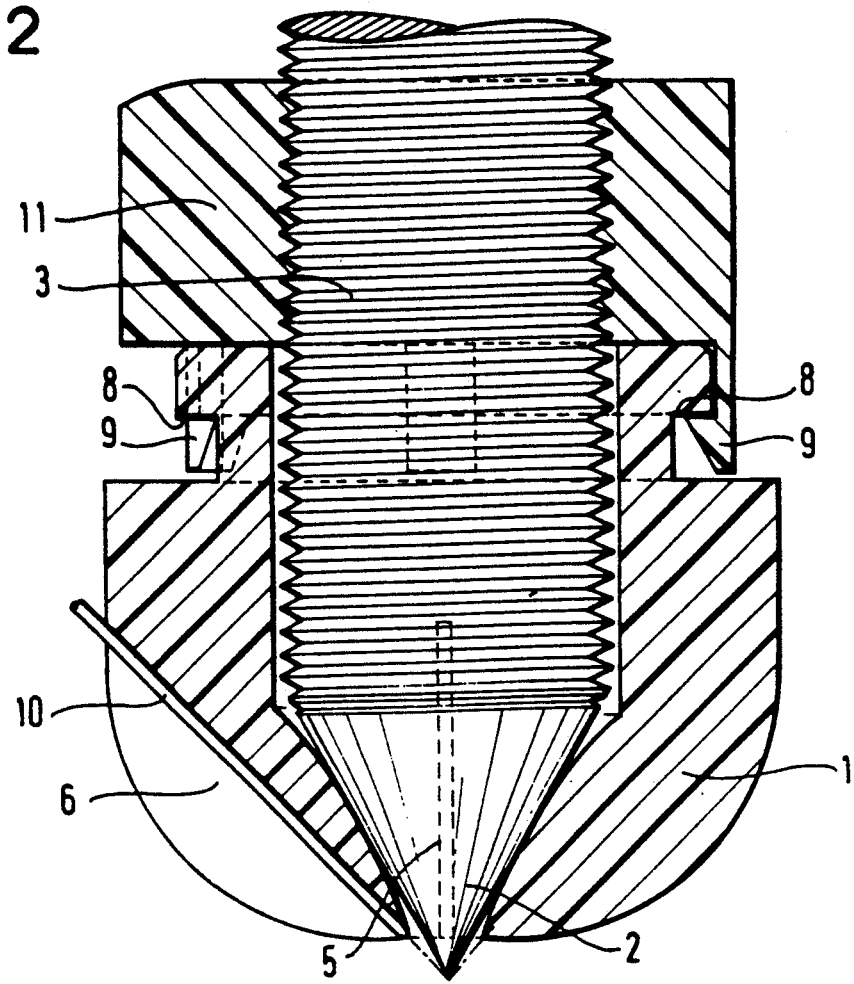
FIG. 2 shows a cross section of the support for optical fibers of FIG. 1, taken along line II—II of that figure, and the electrode itself.

In FIGS. 1 and 2, the support 1 for the fibers near the arc is fixed to the electrode 2 by the intervening nut 11 screwed onto the threads 3 of the electrode.

The support rests by its edge on the head of the nut. It is engaged thereon by snapping its shoulder 8 onto flexible catches 9 formed on the edge of the nut. The fiber support and the nut are made of a plastic—for example of a polyphenylsulfone—with sufficient dielectric strength to not disturb the arc. The optical fibers, such as 10, are arranged in grooves 4, 5, 6, 7 at 90° to one another and inclined 45° in relation to the axis of the electrode; they are stripped of their cladding in the intermediate vicinity of the tip of the electrode in a manner not shown; their ends are a few millimeters from the arc.

Figure 3:
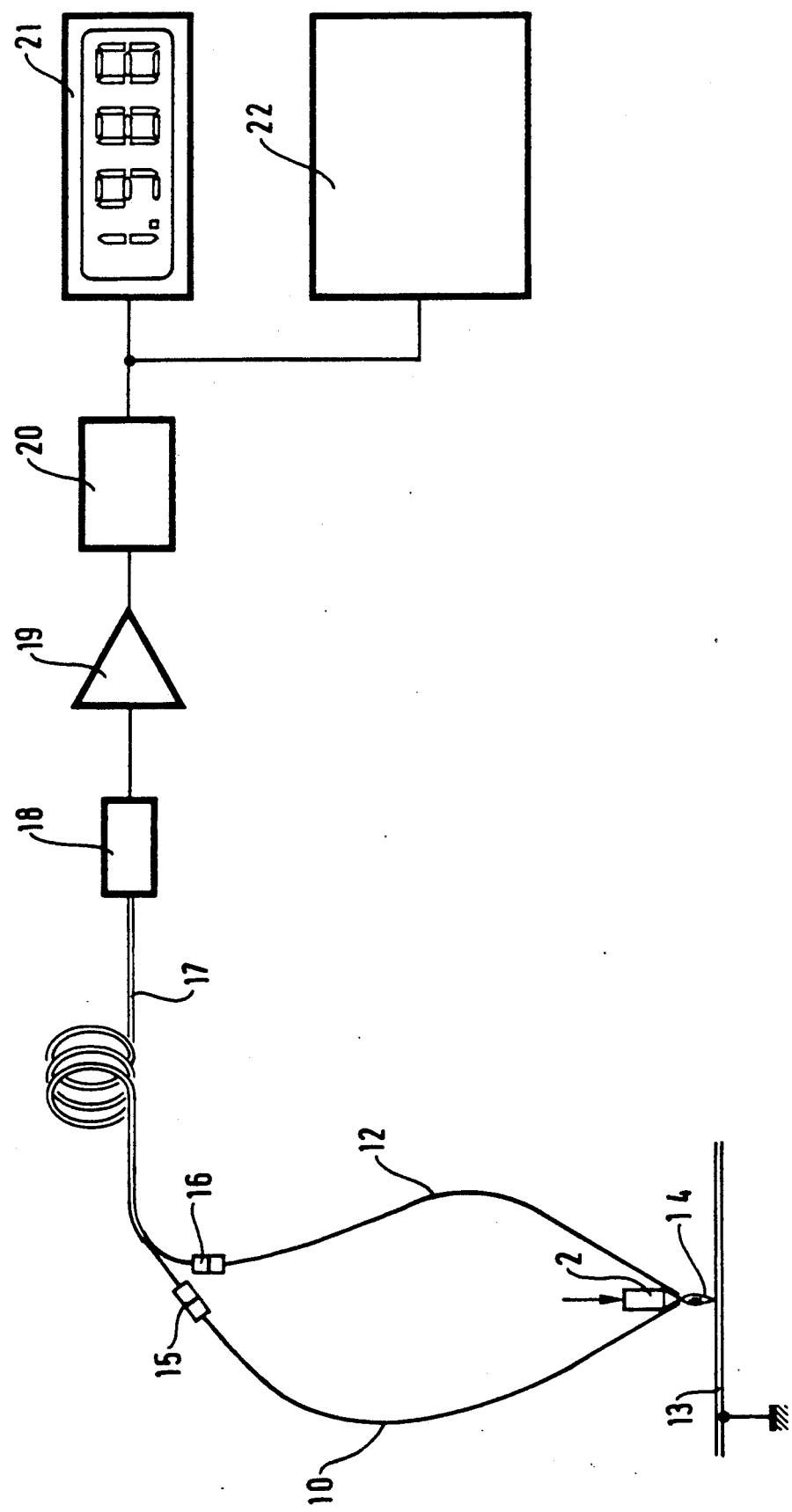
FIG. 3 represents the device as a whole.

FIG. 3 represents the inventive device as a whole in operation. The arc 14 initiates between the anode 2 and the cathode 13, connected to ground. The optical fibers, only two of which 10 and 12 are shown in the drawing, extend to connectors 15, 16. After these connectors, optical fibers assembled into a cable 17 connect up with a photoelectric cell 18. The distance between said cell and the electrode is of the order of five to ten meters. The electric current supplied by the cell, after amplification in an amplifier 19, is transmitted to an electronic card-based recorder 20, which analyses the energy received by the cell. The recorder 20 is connected on the one hand to a display means 21 and on the other to a printer 22 enabling recording of the energies of successive arc discharges.

In the event the ends of the optical fibers on support 1 come to be destroyed, one need only replace the destroyed optical fiber or fibers up to the corresponding connector or connectors.

Figure 4:
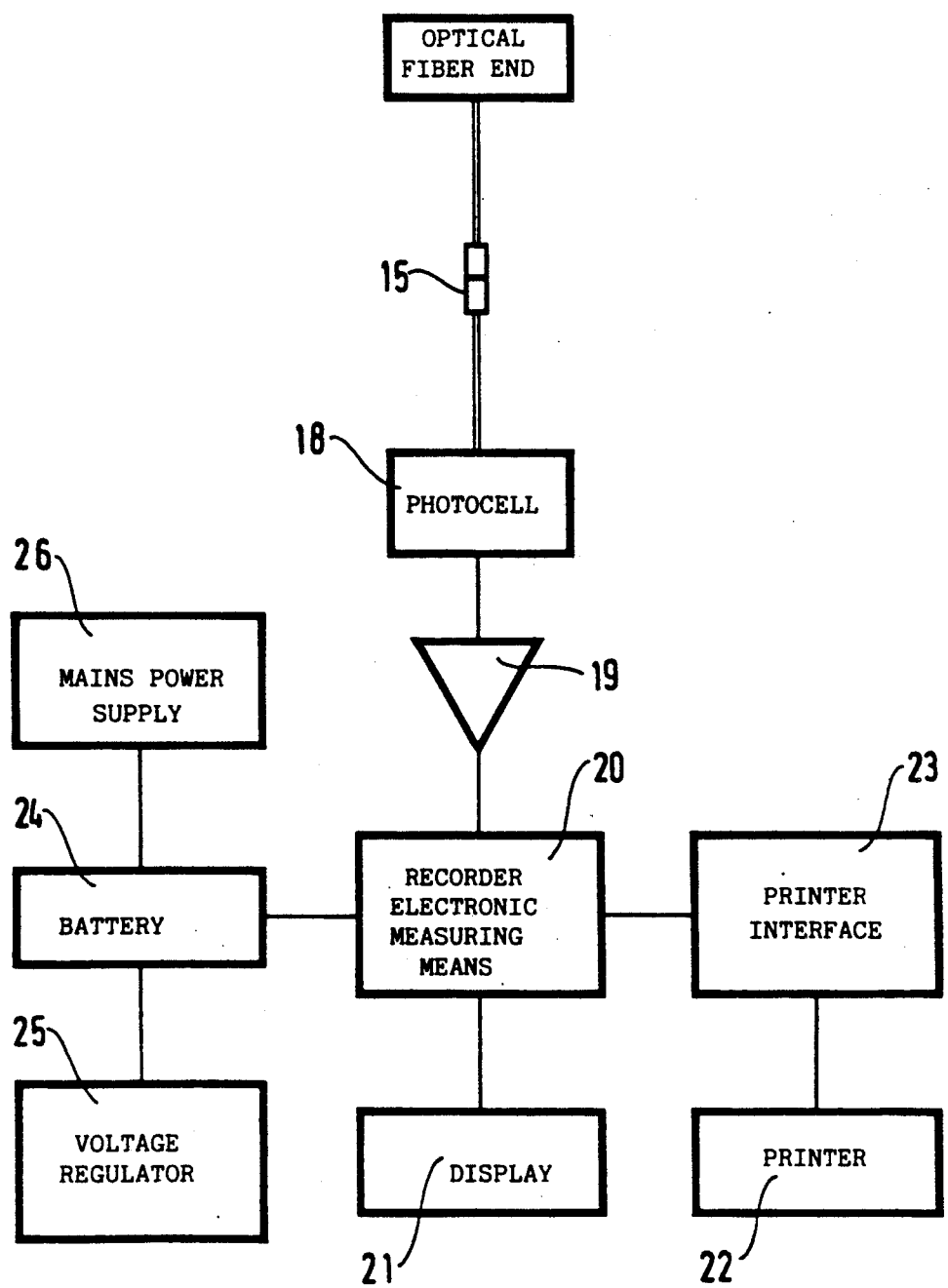
FIG. 4 represents the auxiliary means of the energy measuring and analysis electronic means.

In order to shelter the measuring device from mains disturbances induced by the discharge of the arc, the electronic measuring/recording means 20 is supplied with power from the rechargeable batteries 24, as illustrated in FIG. 4. The latter are connected to a voltage regulator 25 and to a mains power supply 26 so that they can be recharged outside of the periods of arc operation.

The printer 22 is connected to the measuring/recording means 20 via an interface 23.

We claim:

1. Device for measuring the energy of an electric arc, comprising:

(a) a support for at least one optical fiber, disposed on the head of an electrode of the arc, made of a plastic material having sufficient dielectric strength that it will not disturb the operation of the arc, (b) at least one optical fiber secured on said support and having an end adjacent to the tip of the electrode, (c) an optical connector receiving the other end of the optical fiber and one end of an optical fiber cable for connecting with a photoelectric cell, (d) a photoelectric cell disposed at a sufficient distance from the electrode to be immune to disturbances due thereto, and (e) an electronic means connected to the photoelectric cell for recording and displaying the energy given off by the arc.

2. Device according to claim 1, wherein the optical fiber support is secured to the electrode by snapping on the end of a nut screwed onto the threaded periphery of the electrode.

3. Device according to claim 1, wherein the optical fiber support is crossed through with at least one groove for housing the optical fiber.

4. Device according to claim 1, wherein the plurality of optical fibers are regularly distributed around the periphery of the support.

5. Device according to claim 1, wherein the optical fibers support is made of polyphenylsulfone.

6. Device according to claim 5, wherein the support fixing nut is also made of polyphenylsulfone.

7. Device according to claim 1, wherein the electronic recording means is connected to a printer.